United States Patent [19]
Scandura

[11] Patent Number: 6,061,513
[45] Date of Patent: *May 9, 2000

[54] AUTOMATED METHODS FOR CONSTRUCTING LANGUAGE SPECIFIC SYSTEMS FOR REVERSE ENGINEERING SOURCE CODE INTO ABSTRACT SYNTAX TREES WITH ATTRIBUTES IN A FORM THAT CAN MORE EASILY BE DISPLAYED, UNDERSTOOD AND/OR MODIFIED

[76] Inventor: Joseph M. Scandura, 1249 Greentree La., Narberth, Pa. 19072

[ * ] Notice: This patent issued on a continued prosecution application filed under 37 CFR 1.53(d), and is subject to the twenty year patent term provisions of 35 U.S.C. 154(a)(2).

[21] Appl. No.: 08/914,314

[22] Filed: Aug. 18, 1997

[51] Int. Cl.[7] .......................................... G06F 9/44
[52] U.S. Cl. .................. 395/701; 395/702; 395/705; 395/703; 395/708
[58] Field of Search ...................................... 395/701–712

[56] References Cited

U.S. PATENT DOCUMENTS

| | | |
|---|---|---|
| 5,262,761 | 11/1993 | Scandura et al. . |
| 5,481,711 | 1/1996 | Sotani ........................................ 395/703 |
| 5,528,491 | 6/1996 | Kuno et al. ................................... 704/9 |
| 5,790,863 | 8/1998 | Simonyi ..................................... 395/707 |
| 5,812,853 | 9/1998 | Carroll et al. ............................. 395/708 |

OTHER PUBLICATIONS

Aho et al., "Compilers Principles, Techniques, and Tools", Addison–Wesley, pp. 287–293, Mar. 1988.
C.A. Welty, "Augmenting Abstract Systax Trees for Program Understading", IEEE, pp. 126–133, Jan. 1997.
Canfora et al., "A Reverse Engineering Method for Identifying Reusable Abstract Data Types", IEEE, Mar. 1993.

*Primary Examiner*—Tariq R. Hafiz
*Assistant Examiner*—Todd Ingberg

[57] ABSTRACT

Disclosed herein is a method, which can be automated on an information processing device with memory, that dramatically reduces the effort required to create systems for reverse engineering source code in a plurality of structured languages into Abstract Syntax Trees (ASTs), which represent all of the information in said source code, and to automatically analyze, display and/or manipulate those ASTs. This method makes it possible to automatically construct systems for reverse engineering source code in any of a plurality of languages and for analyzing, manipulating and/or converting such code. This method also makes it possible to display and edit information as text in compressed ASTs in human understandable, pre-specified form.

10 Claims, 13 Drawing Sheets

Figure 11.

```
View/Edit Flexform                                              _ □ ×
[java.syn]:Syntax                               Copyright 1997  Scandura
Grammar for reverse-engineering Flexforms.

Note that all grammar nodes below must be grandchildren of this root node, and
that each grandchild must contain a separate production grouping (with the
commands for each production in separate nodes beneath the corresponding
nonterminal).

■ ...........................................................
  } Grammar.                                                  }
  Pseudo_Goal
    -> fraud_simple_statement simple_statement_definition <eof>
    -> fraud_case_statement case_statement_definition <eof>
    -> fraud_if_condition if_condition_definition <eof>
    -> fraud_for_control for_control_definition <eof>
    -> fraud_while_condition while_condition_definition <eof>
    -> fraud_until_condition until_condition_definition <eof>
    -> fraud_case_selector case_selector_definition <eof>
    -> fraud_SWITCH_1 SWITCH_1_definition <eof>
    -> fraud_SWITCH_2 SWITCH_2_definition <eof>
    -> fraud_SWITCH_3 SWITCH_3_definition <eof>
    -> fraud_ELSEIF_1 ELSEIF_1_definition <eof>
    -> fraud_ELSEIF_2 ELSEIF_2_definition <eof>
    -> fraud_ELSEIF_3 ELSEIF_3_definition <eof>
    -> fraud_TRY_1 TRY_1_definition <eof>
    -> fraud_TRY_2 TRY_2_definition <eof>
    -> fraud_TRY_3 TRY_3_definition <eof>
    -> fraud_RETURN_TYPE_value RETURN_TYPE_value_definition <eof>
    -> fraud_PARAMETER_value PARAMETER_value_definition <eof>
    -> fraud_DECLARATIONS_value DECLARATIONS_value_definition <eof>
    -> fraud_INCLUDED_FILE_value INCLUDED_FILE_value_definition <eof>
    -> fraud_INHERITED_CLASS_value INHERITED_CLASS_value_definition <eof>
    -> fraud_INHERITED_INTERFACES INHERITED_INTERFACES_definition <eof>
    -> fraud_CLASS_DECLARATIONS CLASS_DECLARATIONS_definition <eof>
    -> fraud_INTERFACE_DECLARATIONS INTERFACE_DECLARATIONS_definition <eof> simple_statement_definition
    -> THROW Expression ';'
    -> RETURN Expression ';'
    -> RETURN ';'
    -> CONTINUE Identifier ';'
    -> CONTINUE ';'
    -> BREAK Identifier ';'
    -> BREAK ';'
    -> StatementExpression ';'
    -> ';'
    -> SUPER '(' OptArgumentList ')' ';'
    -> THIS '(' OptArgumentList ')' ';'

Commands: Arrows,^x,^g,1..9,+,f,n,b,r,Del,t,m,d,c,a,e,s,^f,l,w,g,p,?,Help=F1,Esc
```

Figure 13.

```
View/Edit Flexform                                            _ □
    -> fraud_SWITCH_1 SWITCH_1_definition <eof>
    -> fraud_SWITCH_2 SWITCH_2_definition <eof>
    -> fraud_SWITCH_3 SWITCH_3_definition <eof>
    -> fraud_ELSEIF_1 ELSEIF_1_definition <eof>
    -> fraud_ELSEIF_2 ELSEIF_2_definition <eof>
    -> fraud_ELSEIF_3 ELSEIF_3_definition <eof>
    -> fraud_TRY_1 TRY_1_definition <eof>
    -> fraud_TRY_2 TRY_2_definition <eof>
    -> fraud_TRY_3 TRY_3_definition <eof>
    -> fraud_RETURN_TYPE_value RETURN_TYPE_value_definition <eof>
    -> fraud_PARAMETER_value PARAMETER_value_definition <eof>
    -> fraud_DECLARATIONS_value DECLARATIONS_value_definition <eof>
    -> fraud_INCLUDED_FILE_value INCLUDED_FILE_value_definition <eof>
    -> fraud_INHERITED_CLASS_value INHERITED_CLASS_value_definition <eof>
    -> fraud_INHERITED_INTERFACES INHERITED_INTERFACES_definition <eof>
    -> fraud_CLASS_DECLARATIONS CLASS_DECLARATIONS_definition <eof>
    -> fraud_INTERFACE_DECLARATIONS INTERFACE_DECLARATIONS_definition <eof>
  ...........................................................
  . simple_statement_definition                               .
  .    -> THROW Expression                                    .
  .    -> RETURN Expression                                   .
  .    -> RETURN                                              .
  .    -> CONTINUE Identifier                                 .
  .    -> CONTINUE                                            .
  .    -> BREAK Identifier                                    .
  .    -> BREAK                                               .
  .    -> StatementExpression                                 .
  .    -> SUPER '(' OptArgumentList ')'                       .
  .    -> THIS '(' OptArgumentList ')'                        .
  ■ 1 + 2
    1 + 2
    1
    1 + 2
    1
    1 + 2
    1
    1
    1 + 2 + 3 + 4
    1 + 2 + 3 + 4
Commands: Arrows,^x,^g,1..9,+,f,n,b,r,Del,t,m,d,c,a,e,s,^f,l,w,g,p,?,Help=F1,Esc
```

AUTOMATED METHODS FOR CONSTRUCTING LANGUAGE SPECIFIC SYSTEMS FOR REVERSE ENGINEERING SOURCE CODE INTO ABSTRACT SYNTAX TREES WITH ATTRIBUTES IN A FORM THAT CAN MORE EASILY BE DISPLAYED, UNDERSTOOD AND/OR MODIFIED

CROSS-REFERENCE TO RELATED APPLICATIONS

Aho, Alfred V., Sethi, Ratvi and Ullman, Jeffery D. Compilers: Principles, Techniques, and Tools. Addison-Wesley: Reading, Mass., 1986.

Canfor, G., Cimitile A., and Munro, M.A Reverse Engineering Method for Identifying Reusable Abstract Data Types. IEEE, 3, 1993.

Scandura., J. M. A cognitive approach to software development: The PRODOC environment and associated methodology. Journal of Pascal, Ada & Modula-2, 6, 1987.

Scandura., J. M. Cognitive approach to systems engineering and re-engineering: integrating new designs with old systems. Journal of Software Maintenance, 1990, 2, 145–156, Scandura., J. M. A cognitive approach to software development: The PRODOC environment and associated methodology. In D. Partridge (Ed.): Artificial Intelligence and Software Engineering. Norwood, N.J.: Ablex Pub., 1991, Chapter 5, pp. 115–138.

Scandura., J. M. Cognitive technology and the PRODOC re/NuSys Workbench(tm): a technical overview. Journal of Structural Learning and Intelligent Systems, 1992, 11, pp. 89–126.

Scandura., J. M. Automating renewal and conversion of legacy code into ada: A cognitive approach. IEEE Computer, 1994, April, 55–61.

Welty, Chistopher A. Augmenting Abstract Syntax Trees for Program Understanding. IEEE, 1, 1997.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

Understanding and maintaining source code is largely a manual process. A human must study the code to understand what it is doing and must make desired changes to the code manually in a text editor. To help automate some of the more common and onerous tasks a variety of text editors have been constructed to analyze and manipulate text files containing source code. Many of these editors are based on tools such as grep, awk and their derivatives for analyzing regular expressions. Such editors help in detecting patterns and often make provision for automatically changing the code. Text-based tools work reasonably well with easily identified text groupings (e.g., text on one or more lines) but they fail to adequately address structural characteristics of the code. It is not feasible, or in many cases even possible to detect complex structural patterns in the code, much less to make desired changes.

The current state of the art is based on repository technology, in which code is typically reverse engineered into abstract syntax trees. Reverse engineering technologies are based on grammar-based parsers and associated lexical analyzers, which identify structural characteristics of the source code. These characteristics may range from the highest (e.g., program) level of abstraction inherent in a file to the lowest level tokens (items which make up individual expressions). In this case information is stored in what are commonly called abstract syntax trees (ASTs), in which individual nodes may have various attributes. For example, a variable may have type and/or value attributes.

ASTs themselves are typically constructed by attaching small routines or code fragments (hereafter commands) to individual productions in the grammar, which work in conjunction with a language independent parser. Specifically, a programmer or parser generation program (e.g., YACC) attaches commands to individual productions in the associated grammar, which convert code as it is being parsed into an AST.

The process of constructing standard ASTs from given source code using a grammar representing the language in which the source code is written is well known (e.g., Aho, Sethi & Ullman, 1986). Parsing source code into trees plays a major role in analyzing and/or transforming that text. A variety of techniques have been used to improve the process of compiling source code. Carroll et al (U.S. Pat. No. 5,812,853), for example, revealed an improved form of prefix analysis to speed the process. Parsing techniques have also been used to analyze and/or translate natural language text. Kuno et al (U.S. Pat. No. 5,528,491), for example, propose a system that allows human operators to interact with automated translation processes in a way that preserves correct portions of the translation. Success in attaching semantic information to ASTs for reverse engineering purposes and/or to facilitate program understanding also has been achieved (e.g., Canfor, Cimitile & Munro, 1993; Welty, 1997).

Although the process itself is well known and widely used, creating reverse engineering systems that can automatically construct ASTs from source code takes a good deal of manual effort. The more constraints on, or special characteristics an AST is to have, the more effort that is required.

Knowing which commands (or routines) to attach to which productions to construct particular types of ASTs is not an easy task. It requires intimate familiarity with the grammar, the goal to be achieved (e.g., the type of AST) as well as the programming language used. For example, it is relatively easy to construct ASTs from source code where all constructs in the language are handled in a uniform manner. That is when everything from atomic tokens in the language to high level constructs (e.g., procedural refinements, relations between modules, units, etc.) are to be represented as nodes in ASTs in the same manner.

Attaching commands to individual productions in a grammar to achieve prescribed puposes is complicated. Adding semantic attributes to, or constraints on, the to-be-constructed ASTs further complicates the process. Achieving any specific goal, whether it is to construct a particular kind of AST from source code, or to manipulate text using a grammar requires attention to all such commands and the grammatical context in which they are executed. In particular, commands attached to any one production must take into account commands attached to other productions, which will be executed when the source code is parsed. In addition, attributes derived by manipulating tokens associated with any one production may effect what manipulations are to be performed by other productions. Complications deriving from such context dependencies increase rapidly both with the number of dependencies and the length of the grammar. Cyclic relationships in grammars further complicate the situation.

Given the large variety of programming languages and dialects, it is not practical to develop manual solutions for more than a small fraction of the many possible code variants. The present disclosure reveals a method that dramatically simplifies, even automates the creation of automated reverse engineering systems for constructing specified kinds of ASTs from source code, for example Flexform ASTs (originally called FLOWforms, Scandura, U.S. Pat. No. 5,262,761).

Editing, displaying, analyzing and manipulating ASTs also can be done in a relatively straightforward manner. Sotani (U.S. Pat. No. 5,481,711) further disclosed a specific method motivated by YAAC programs for editing source text data lexically and structurally by reference to its corresponding AST. Simonyi (U.S. Pat. No. 5, 790,863) recently received a patent for incrementally constructing, displaying and editing trees without parsing the text. His disclosure shows how trees representing computer programs can be constructed by a user as source code is written and/or edited. Simonyi also shows how the underlying trees can be displayed in various programming languages. Scandura (1987, 1990, 1991, 1992, 1994) earlier showed other ways of accomplishing the same things. Once information is in an AST, information in the AST may be displayed, edited, manipulated and/or otherwise converted by writing code that applies directly to the AST. In general, ASTs make it easier to manipulate information associated with source code than when in text form. Sotani (U.S. Pat. No. 5,481,711), for example, describes one such method suited for editing source code text by reference to its corresponding AST. Simonyi (U.S. Pat. No. 5, 790,863) reveals another such method for editing ASTs. For example, ASTs can be displayed by writing routines that operate directly on the ASTs. Displays also can be constructed by converting ASTs into a form that can be used by an existing display technology. Software systems are commonly available for displaying information in ASTs as simple tree views, data flow diagrams, structure charts, Nassi-Shneiderman charts and Flexforms (formerly known as FLOWforms, Scandura, U.S. Pat. No. 5, 262,761) among others. The Simonyi disclosure also shows one way in which ASTs may be displayed in multiple languages.

The present disclosure is not concerned with editing ASTs or the text they may represent, nor is it concerned with displaying ASTs. Rather, it is concerned as above with simplifying the construction of ASTs, and with the automated analysis and manipulation of ASTs once they have been constructed.

In general, ASTs make it easier to automatically analyze and/or manipulate information associated with source code than when the information is in text form. Various scripting and other languages have been developed to facilitate the automated analysis, manipulation and/or conversion of ASTs. The goal of these languages typically is to make it possible to detect complex structural patterns and to manipulate those patterns.

Although GUI interfaces and/or automated aides may facilitate the process, programmers still need to address the full complexity of a single AST representing an entire program (or set of programs). The high degree of human effort required limits the construction of automated analysis and/or conversion processes to common, general purpose problems (e.g., converting from one language or operating system to another). Indeed, the cost of constructing automated technologies to satisfy application specific conversion needs is prohibitive using current technologies.

Another major limitation is that programs are typically represented as single, comprehensive ASTs (trees) that are very difficult, if not impossible, for human beings to understand. Nodes in a traditional AST range from atomic level terminal tokens at the bottom of the tree to the highest level abstractions.

Furthermore, automatic processing of full uncompressed ASTs often takes too much time. It is well known that the size of an AST grows rapidly (exponentially) with the source code being processed. Consequently, as the length of the source code increases, the time required to process an AST representing that source code quickly becomes too long for many practical purposes, whether for display, editing, analysis or manipulation purposes. Experience with reverse engineering tools that use unitary repositories suggest 10–12,000 lines of source code in the upper ranges of (corresponding) ASTs that can be processed efficiently. At 100,000 lines of code, a figure in the lower ranges of industrial strength systems, such systems become impractical (Doug Foley, personal communication).

Given a YAAC/Bison style grammar and lexical analyzer, Scandura (e.,g., 1987, 1992) has shown how the size of the ASTs necessary to represent a program can dramatically be reduced. Source code is represented in terms of: a) the textual statements or statement-level ASTs, b) module ASTs whose terminal nodes either contain those statements or reference the statement-level ASTs, c) ASTs representing relationships between the AST modules (e.g., call hierarchies) and d) unit level ASTs representing relationships between the files (units) in a software system. In effect, individual statements, modules, call trees, and unit hierarchies are represented as separately although linked ASTs. Partitioning AST representations of source code in this manner (hereafter referred to as partitioned or compressed ASTs) dramatically reduces the complexity of the individual ASTs needed to represent source code. The present disclosure reveals processes whereby source code may automatically be reverse engineered into partitioned ASTs, and whereby partitioned ASTs may automatically be analyzed and/or manipulated.

This reduction in size is especially important when automatically processing ASTs, especially in analysis and manipulation where reference is required to multiple parts of the ASTs. Instead of going up exponentially with size of the ASTs, as when ASTs are used to represent entire programs, experience shows that increases in processing time are essentially linear.

Retaining full statements in a language as text in terminal elements of module ASTs makes it much easier for humans to understand and modify the associated code (e.g., Scandura, 1987). Representing statements as text in terminal nodes of module ASTs also facilitates human editing. Consequently, module ASTs, as well as the higher level ASTs linking them, may be referred to as compressed ASTs. (Full source code can be generated from such ASTs as desired.)

The present disclosure shows how automated processes for reverse engineering source code into ASTs may be constructed with automated support, requiring a minimum of human input. Once constructed, it also shows how automated analysis and/or conversion processes may be constructed in a highly efficient manner, again with minimal human support. Special attention is given to constructing automated analysis and/or conversion processes by reference to smaller, more easily understood ASTs.

ASTs can be displayed by writing routines that operate directly on those trees. Displays also can be constructed by converting ASTs into a form that can be used by an existing display technology. Software systems are commonly available for displaying information in ASTs as simple tree views, data flow diagrams, structure charts, Nassi-Shneiderman charts and Flexforms (formerly known as FLOWforms, Scandura, U.S. Pat. No. 5, 262,761) among others.

Although GUI interfaces and/or automated aides may facilitate the process, programmers still need to address either the full complexity of a grammar or of the corresponding uncompressed AST. To display information, for example, the programmer must either write commands for each production in a grammar or write a full display program, which analyzes and manipulates all of the information in the AST. (The latter code may either operate directly on ASTs or convert such trees into a form that can be used by existing code).

In effect, the programmer must deal with the full complexity of either the grammar or the corresponding AST. Attributes derived by manipulating tokens associated with any one production may effect what manipulations are to be performed with another production. Complications deriving from such context dependencies increase rapidly both with the number of dependencies and the length of the grammar. Cyclic relationships in grammars further complicate the situation. Similarly, levels in a traditional AST range from atomic level terminal tokens at the bottom of the tree to the highest level abstractions. The programmer must be concerned both with assembling low-level tokens as well as addressing higher level relationships.

Given the large variety of programming languages and dialects, not to mention the indefinitely large number of ways of manipulating code, it is not practical to develop manual solutions for more than a small fraction of the many possible code variants. The present disclosure reveals a method that dramatically simplifies the process of constructing automated processes for reverse engineering source code into compressed ASTs that can more easily be displayed, understood, analyzed, edited and manipulated.

BRIEF SUMMARY OF THE INVENTION

Disclosed herein is a method, which can be implemented in any information processing device with memory, that dramatically reduces the effort required to create, understand, display and/or modify information in ASTs with attributes. The disclosed methods make it possible to automatically construct ASTs with attributes from source code, including compressed ASTs. Compressed ASTs are ASTs in which terminal elements consist of human readable text (e.g., statements, declarations) associated with specified higher level (i.e., non-terminal) tokens in the associated grammar.

Given a grammar and lexical analyzer for a given language, and an associated language independent parser (e.g., YACC, Bison), and a set of programming commands that is sufficient for constructing and assigning attributes to nodes and subtrees in ASTs, the disclosed method requires the user to identify constructs in the source language that are to be represented as terminal nodes containing text (e.g., statements, declarations) and as non-terminals (e.g., If..then..else constructions) in compressed ASTs. Each identified node construct is then matched with specific right hand side tokens in specific productions in the grammar. Given this information, code for constructing the specified, possibly compressed AST can automatically be constructed and attached to the specified productions.

Compressed ASTs can be displayed in a human readable form more directly than traditional (uncompressed) ASTs. The terminal nodes in said compressed trees contain text, such as statements and declarations, which correspond to concatenations of lower level (e.g., terminal) tokens in the corresponding grammar. Consequently, terminal nodes can be displayed without having to assemble (lower level) nodes (as would be necessary in uncompressed ASTs).

Non-terminal nodes also correspond to meaningful, albeit higher level code constructs such as IF..THEN and SEQUENCE constructions. In short, this method results in (compressed) ASTs in which specified terminal and non-terminal code constructs are stored in a form that is easily understood by humans.

Related methods are disclosed, which also make it possible to analyze, modify and/or convert information in compressed ASTs more simply than were this done in conjunction with traditional (uncompressed) ASTs. In particular, text in terminal nodes may be manipulated independently of higher levels of the AST. This is accomplished using simplified "fraud" grammars, which can automatically be extracted from given grammars. Commands may be attached directly to individual productions in fraud grammars to perform desired low level manipulations. Higher levels of the AST may be manipulated (and/or converted) independently, and consequently more simply than in uncompressed ASTs.

BRIEF DESCRIPTION OF THE SEVERAL VIEWS OF THE DISCLOSURE

FIG. 1. Method for constructing programming language and/or dialect specific reverse engineering systems for automatically extracting compressed ASTs with attributes from arbitrary source code in the given language.

FIG. 2. Build reverse engineering machinery for constructing compressed ASTs, which are consistent with the constructs specified above, from source code in the given language.

FIG. 3. Given a grammar and lexical analyzer for a given programming language or dialect, and an associated language independent parser, and constructs selected in accordance with FIG. 1, a method for constructing a complementary fraud grammar for parsing and manipulating terminal-level constructs in the corresponding compressed AST for the given language.

FIG. 4. Given a compressed AST with attributes constructed in accordance with the method of FIG. 1 and a fraud grammar constructed in accordance with the method of FIG. 3, a method for analyzing and converting at least one of: (a) said terminal nodes using said fraud grammar and (b) said compressed tree, wherein said terminal nodes include text (e.g., statements, declarations).

FIG. 5. Dialog box showing portions of an imported Java grammar in BNF form.

FIG. 6. Sample screen in the current Flexsys implementation. The tree view shows the kinds of information, in addition to a grammar, that are needed to automatically create Flexform displays from source code.

FIG. 7. Flexsys automatically identifies key words and other terminals in the grammar, along with a preliminary categorization. The default category is "keyword". The user must re-categorize terminals for which patterns are needed and define those patterns. In the preferred embodiment, patterns are described using any well-known syntax for regular expressions.

FIG. 8. This dialog box shows how constructs in a language are entered in Flexsys. This example involves the Java language. Notice that these constructs identify those aspects of the language that are distinguished in Flexform displays. These constructs include the kinds of Flexform modules (e.g., function, class), data sections (e.g., PROCEDURE, PARAMETER, DECLARATIONS) and procedural refinements (e.g., block, if.then, switch, etc.).

FIG. 9. Dialog box showing assignment of productions to characteristics of the display in FIG. 8. Specific tokens in productions in the grammar must be assigned to the to-be-displayed language (e.g., Java) constructs. This dialog shows buttons indicating the kinds of tokens (in productions) to be assigned for each Flexform type, buttons indicating the kinds of tokens for Sections and buttons indicating each procedural refinement. It also makes it possible to omit tokens (e.g., {, ;) from the display.

FIG. 10. This dialog shows a sample interface used in the preferred Flexsys embodiment to assign tokens in individual productions to language constructs. In this case, the title bar indicates that we are to assign productions to IF refinements. As shown in the middle window, we have already assigned three productions to IF refinements. (If assign were pressed again, the highlighted production at the top would be added to the list.) The bottom window lists all parts (e.g., condition) of the IF construct. One or more right side tokens must be selected for each part. In general, given a construct in the language to be displayed, the user first identifies associated productions. Then, he identifies right hand tokens in that production which correspond to critical parts of the construct.

FIG. 11. Shows a Flexform (i.e., fraud) grammar used to syntax check the contents of individual nodes (elements) in Java Flexforms. This grammar was automatically derived from the full Java grammar supplemented with productions assigned to Java element constructs using the method described in FIG. 3.

FIG. 12. Sample information used in formatting text (e.g., source code) generated from the compressed AST with attributes.

FIG. 13. Shows a Flexform grammar supplemented with commands used to convert Java code from one form to another. The default commands shown below the second set of productions are automatically derived and leave the tokens in their original form. For example, the first command "1+2" applies to the first production "simple_statement_definition->THROW Expression". It places the first right hand token "THROW" first and, "Expression" second. The simple command 2+1, of course, would do the reverse. More complex commands are used to construct or modify structures, save files, etc. Some commands apply to individual (elements) in Java Flexforms. Other commands operate on data generated by previously executed commands. In the preferred embodiment, special commands may operate on individual Flexform modules or entire systems, either before or after individual nodes are processed.

DETAILED DESCRIPTION OF THE INVENTION

Figure 1:
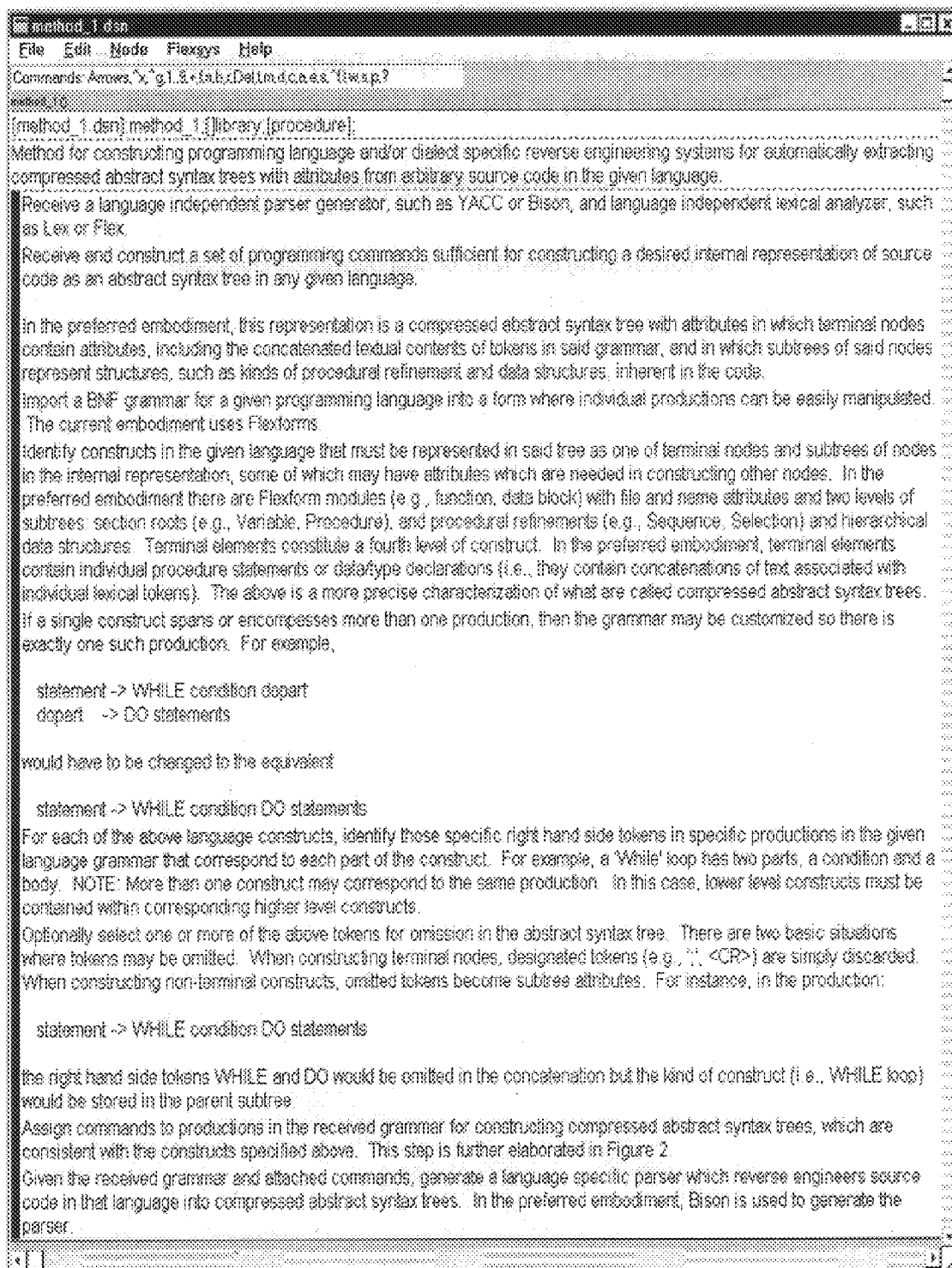
Figure 2:
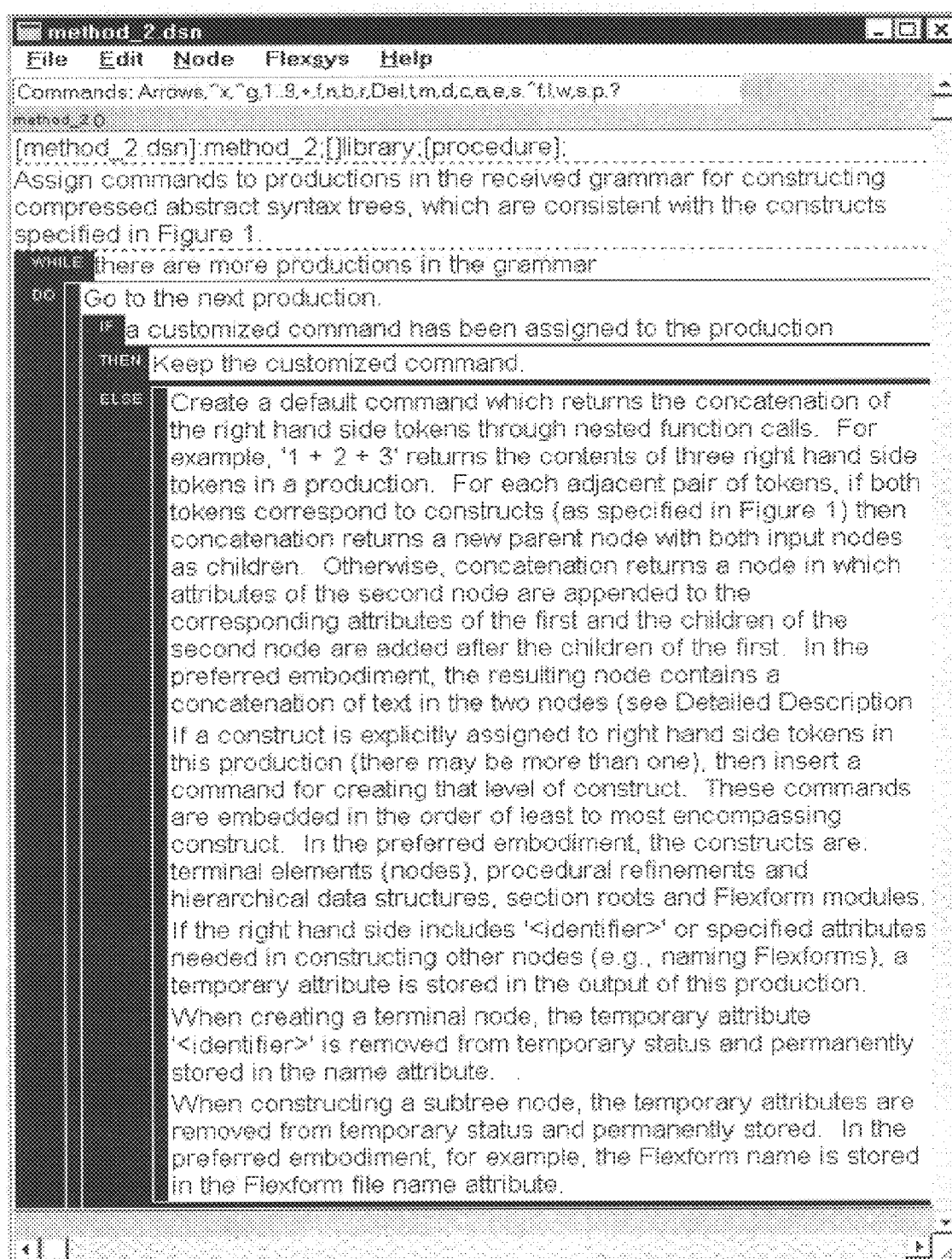

The present disclosure is described herein as implemented in the Flexsys customizable reengineering and conversion automation system. FIG. 1 describes a method for constructing programming language and/or dialect specific reverse engineering systems for automatically extracting compressed ASTs with attributes from arbitrary source code in the given language. FIG. 2 elaborates on the step in FIG. 1 for building reverse engineering machinery for constructing compressed ASTs, which are consistent with the constructs specified in FIG. 1, from source code in the given language.

Figure 3:
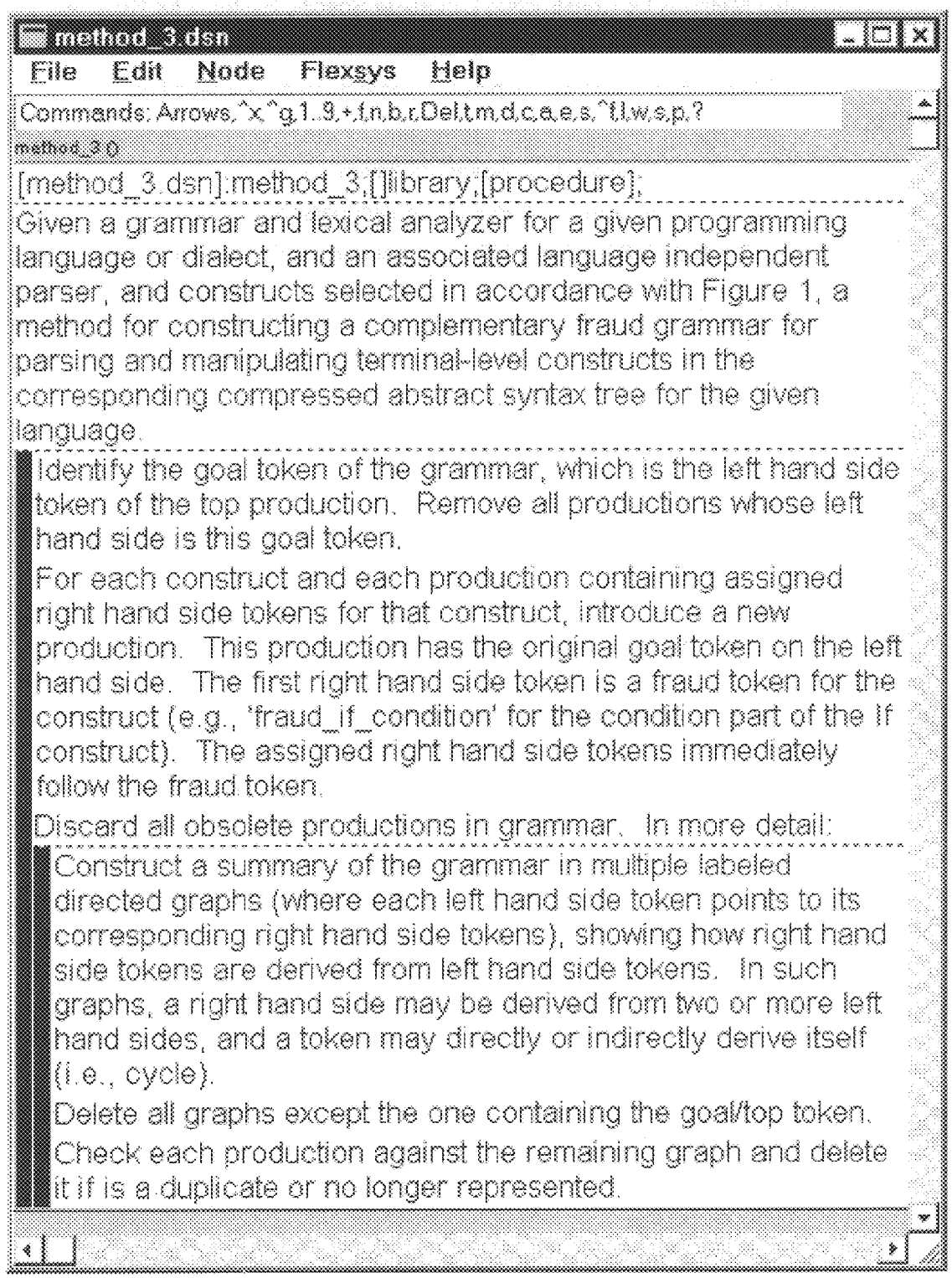
Figure 4:
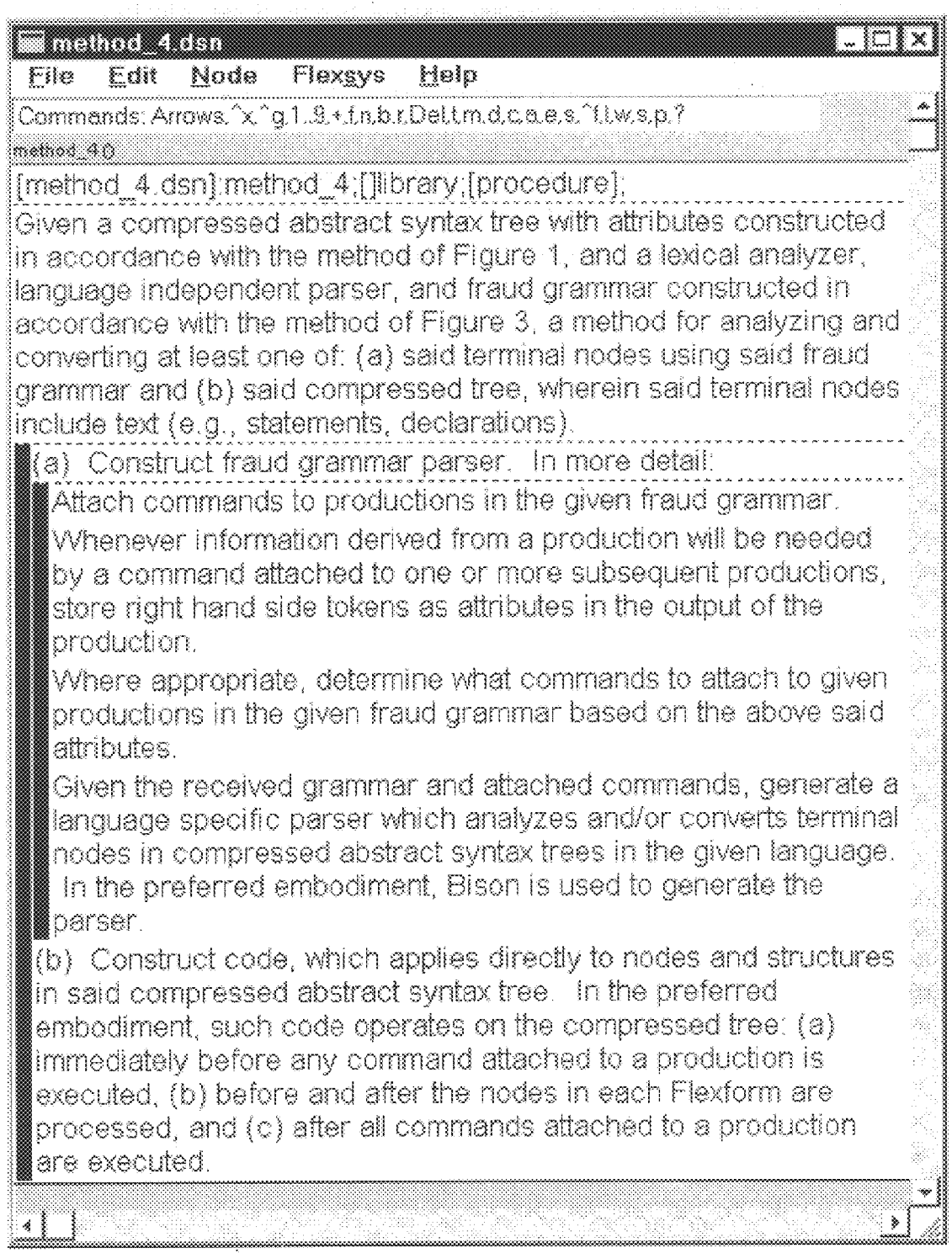

Given a grammar and lexical analyzer for a given programming language or dialect, and an associated language independent parser, and constructs selected in accordance with FIG. 1, FIG. 3 describes a method for constructing a complementary fraud grammar for parsing and manipulating terminal-level constructs in the corresponding compressed AST for the given language. Given a compressed AST with attributes constructed in accordance with the method of FIG. 1 and a fraud grammar constructed in accordance with the method of FIG. 3, FIG. 4 describes a method for analyzing and converting at least one of: (a) said compressed tree, wherein said terminal nodes include text (e.g., statements, declarations) and (b) said terminal nodes using said fraud grammar.

The methods described in these figures are applicable in the construction of all kinds of ASTs with attributes based on language specific parsers. However, specific reference herein is made to the preferred representation of ASTs with attributes in a form that can be displayed as Flexforms. As shown in Scandura (U.S. Pat. No. 5,262,761) these Flexforms have the advantage that arbitrary levels of abstraction in procedural designs can be displayed in context. In that disclosure, Flexforms were originally referred to as FLOW-forms. ("Flexform" was later chosen because it better represents the dynamic character of the display.) It is clear to anyone skilled in the art that Flexforms represent just one of the many possible ways of displaying information in ASTs.

Figure 5:
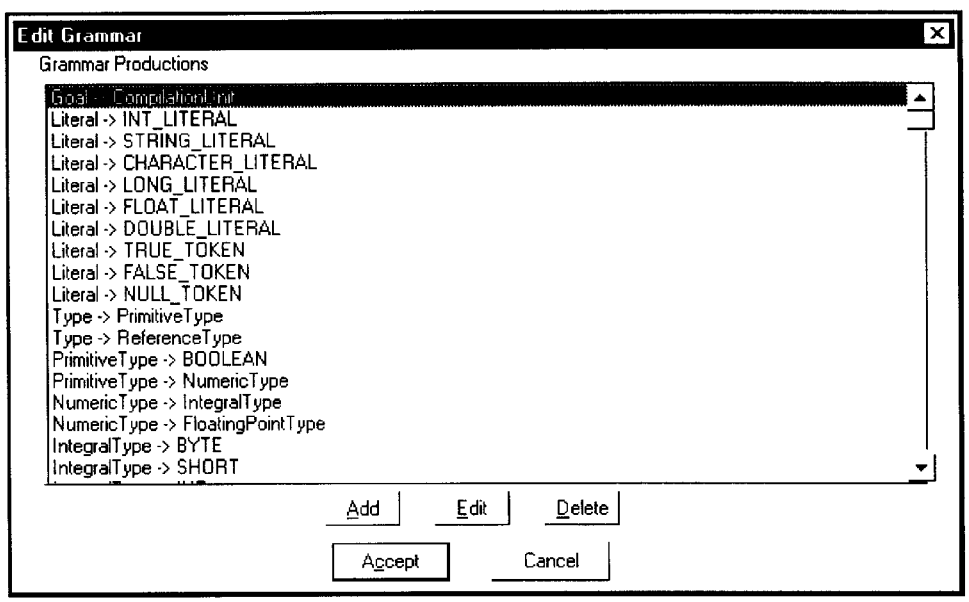

The remaining drawings illustrate the steps in the above Figures in the current Flexsys implementation. FIG. 5 shows a dialog box displaying portions of an imported Java grammar in BNF form. The user can easily add, delete or modify productions in this form.

Figure 6:
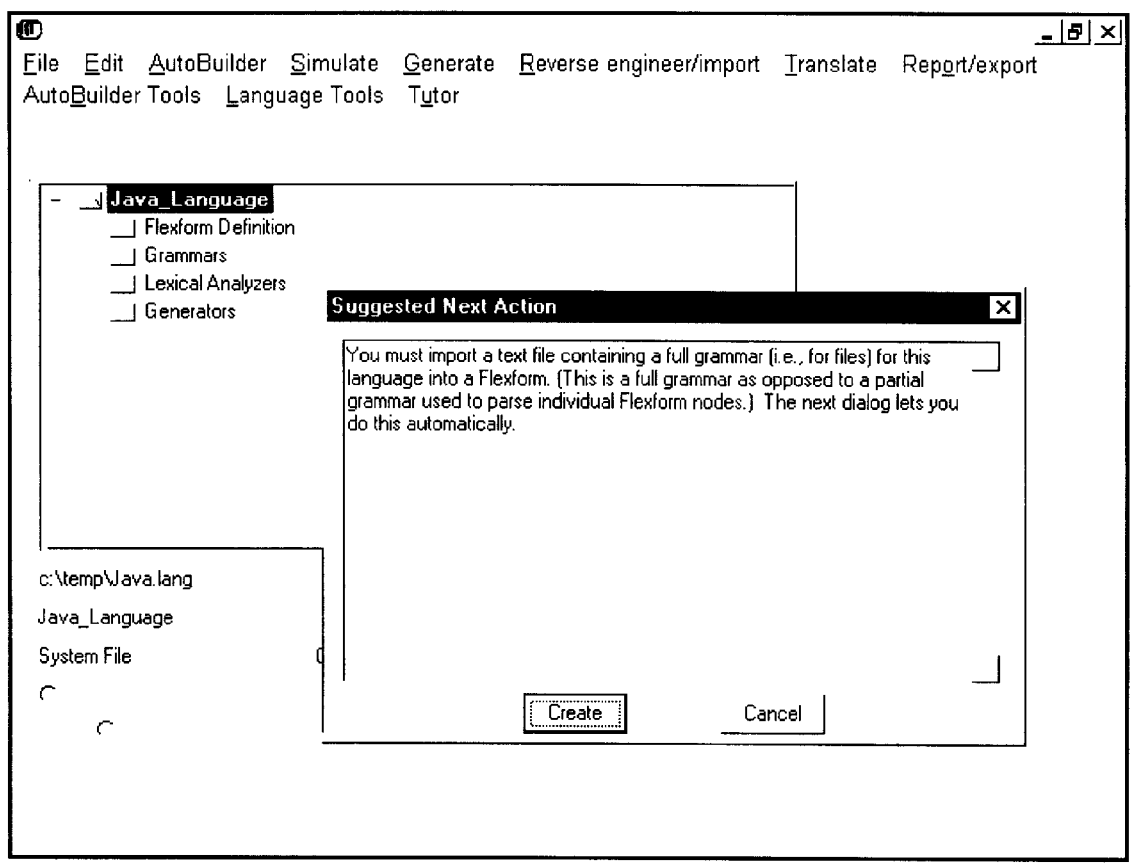

The sample screen in FIG. 6 provides an overview of the kinds of information required for constructing compressed ASTs from given grammars. In particular, the tree view shows the kinds of information needed to automatically create Flexform displays from source code and for manipulating and converting said trees into a new form. This new form may range from modifying the tree itself and/or the information in it to regenerating source code from said trees. Constructs to be displayed in Flexforms are specified in the Flexform Definition file. The other items refer to Grammars for the language and associated Lexical patterns. The grammars include both full and what are herein called fraud grammars. The former are used in constructing compressed ASTs with attributes. The latter are used in conjunction with the compressed ASTs for manipulating and converting the information contained therein. Generators refer to conversions from Flexforms to text, in particular from Flexforms to the source code from which the Flexforms were constructed, or to textual reports on various characteristics of the Flexforms (and hence of the source code itself).

Figure 7:
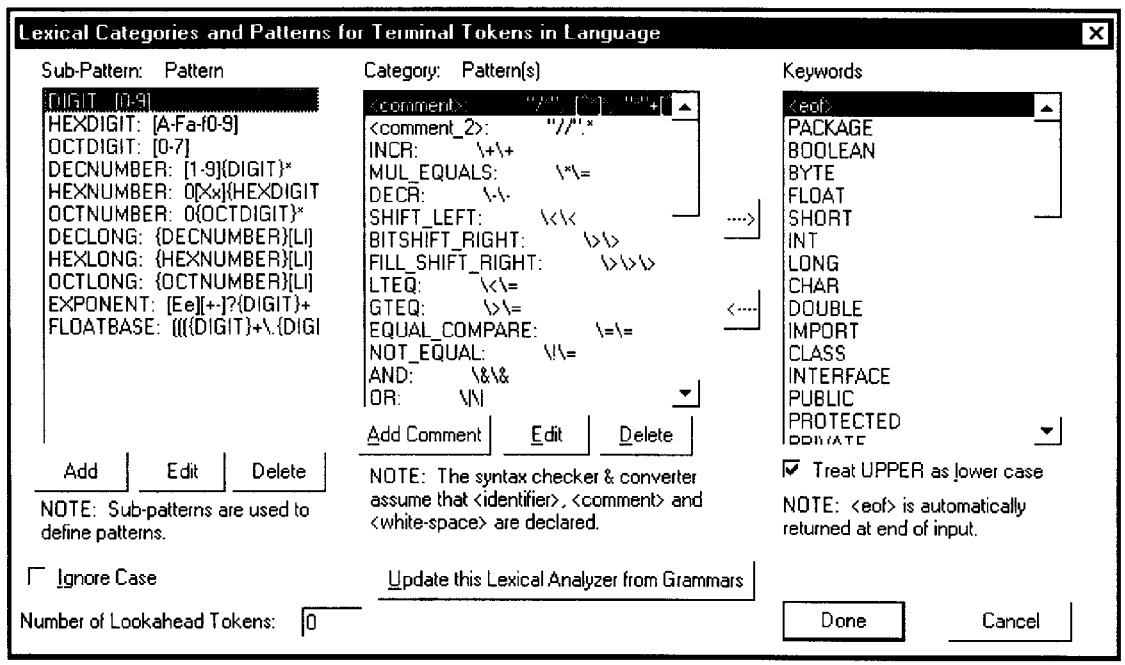

Flexsys automatically identifies key words and other terminals in the grammar, along with a preliminary categorization. The default category is "keyword". FIG. 7 shows the interface used to re-categorize terminals and define patterns. The user must complete the categorization and define those patterns. In the preferred embodiment, patterns are described using the well-known "grep" syntax in Unix for regular expressions.

Following is a list of simple functional so-called SLANG commands used in Flexsys. SLANG commands may be embedded in other commands, including the simple control structure:

If CONDITION then Exp1 else Exp2 endif When attached to appropriate grammar productions these commands are sufficient for constructing ASTs in a form compatible with Flexsys' Flexform display routines. Particularly, notice the importance played by the "+" command. Flexsys also includes reference to a much richer High Level Design (HLD) language for operating on both ASTs as well as in conjunction with productions in grammars.

STRUCTURE BUILDING embed_structure (STRUCTURE_TYPE, STRUCTURE_ROOT, STRUCTURE_PARENT)
    add_as_last_child (ELEMENT, STRUCTURE)
    make_section (NAME, STRUCTURE)
    make_sequence (STRUCTURE)
    make_if_then (IF_PART, THEN_PART)
    make_if_then_else (IF_PART, THEN_PART, ELSE_PART)
    make_while (CONDITION, BODY)
    make_until (BODY, CONDITION)
    make_for (LIMITS, BODY)
    make_case (SELECTOR, ALTERNATIVES)
    make_terminal_node (STRUCTURE)
    make_alt_structure (TYPE, STRUCTURE)
    make_terminal (STRUCTURE)
    delete_named_child (NAME, STRUCTURE)
    get_nth_node (NUMBER, LIST)
    element_with (FIELD, VALUE, STRUCTURE, IGNORE_CASE)

INDIVIDUAL FIELDS replace_fields (NAME, TYPE, STRUCTURE, ROLE, VALUE, DIALOG_RESPONSE, ELEMENT)
    replace_heading_fields (FILE_NAME, NAME, LANGUAGE, RULE_TYPE, RETURN_TYPE, DESCRIPTION, HEADING_ELEMENT)
    insert_name (NAME, NODE)
    get_name (NODE)
    insert_data_type (TYPE, NODE)
    get_data_type (NODE)
    insert_structure_type (LABEL, NODE)
    get_structure_field (NODE)
    insert_label (LABEL, NODE)
    get_label_field (NODE)
    insert_temp_label (LABEL, NODE)
    get_temp_label (LABEL, NODE)
    insert_value (VALUE, NODE)
    extract_comment (TOKEN)
    delete (TOKEN)
    insert_value_named_child_into_field (NAME, FIELD, STRUCTURE)

CONDITIONS next_element_exists (ELEMENT, PARENT)
    is_equence (STRUCTURE)
    Node1=Node2
    Cond1 and Cond2
    Cond1 or Cond2
    not CONDITION

MISCELLANEOUS save (FLEXFORM_TYPE, STRUCTURE)
    Node1+Node2

DETAILED DESCRIPTION OF '+':

"+" is the default SLANG command used in conjunction with all productions that do not correspond directly with a specified construct (e.g., element, section, procedural refinement) in the language. What the "+" command returns depends on the operands (i.e., nodes) in question, in particular on whether the nodes are "complete". Complete Flexform nodes have a non-empty STRUCTURE field (e.g., containing TERMINAL, SEQUENCE, etc.). Incomplete Flexform nodes in the preferred embodiment (with empty STRUCTURE fields) contain such things as partial statements, partial declarations, comments, 'white space'.

Four different situations may occur:

1. If Node1 and Node2 are complete, then they are embedded under a new but extendable SEQUENCE designated by "temporary-list",
2. If Node1 is labeled as "temporary-list" and Node2 is complete, then the entire structure of Node2 is copied as the new last child of Node1 (i.e., we add to the existing "temporary-list"),
3. If only one of Node1 or Node2 is complete, then the VALUE of the incomplete node (usually a comment) is concatenated to the complete node and the children of the incomplete node are copied after the last child of the complete node, and
4. If Node1 or Node2 is nill then the other node is returned. Although binary, the "+" command may be embedded arbitrarily. In the preferred embodiment, this is normally written "Node1+Node2+. . . +Noden" (i.e., without parentheses). In particular, it can be applied to any two or more tokens on the right hand side of a production. Consequently, the "+" command provides a foundation for constructing all temporary nodes and structures needed in constructing Flexforms (i.e., compressed ASTs). The command both concatenates textual contents of nodes and constructs temporary list structures whose children are nodes. It also serves to add comments and 'white space' to nodes. (White space and comments attached to Node2 are appended to Node1 before Node2 is appended.) Other SLANG commands are used to create designated constructions in the final Flexform (i.e., compressed AST). Commands attached to productions associated with these constructs include such things as saving Flexforms, and constructing sections, procedural refinements (e.g., make_sequence, make_selection, make_if_then_else) and terminal data and procedural elements.

Figure 8:
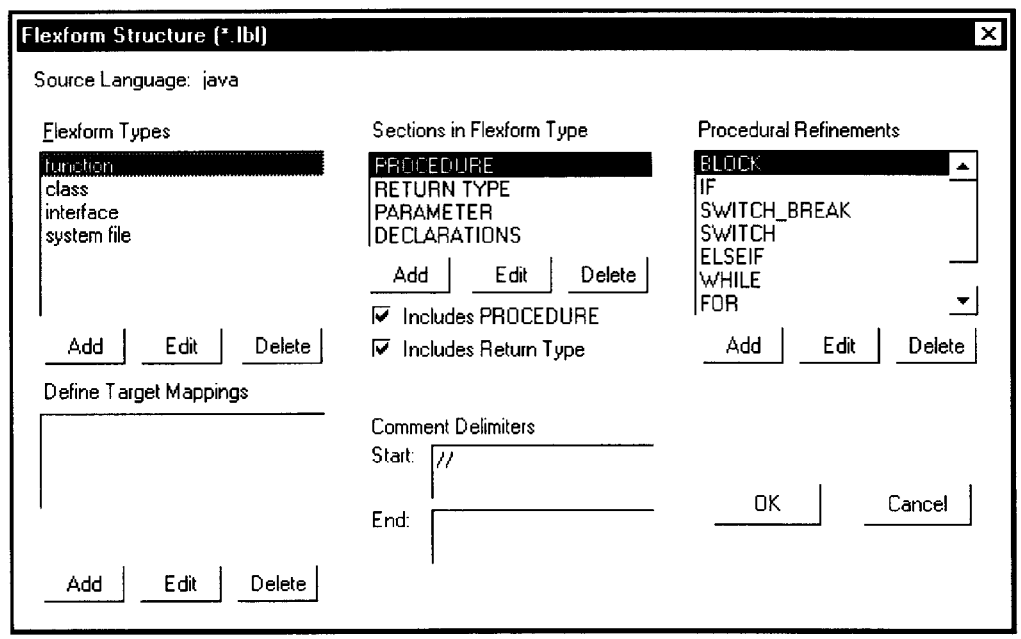

Before these commands can be assigned, the user must define the way source code in the language is to be represented (e.g., as a Flexform). FIG. 8 shows how defining constructs in a language are entered in Flexsys. This example involves the Java language. Notice that these constructs identify those aspects of the language that are distinguished in Flexform displays. These constructs include the kinds of displays (e.g., function, class), data sections (e.g., PROCEDURE, PARAMETER, DECLARATIONS) and procedural refinements (e.g., block, if.then, switch, etc.). All programs represented as Flexforms have a system file Flexform which references top level Flexforms. Flexforms, in general, may include (i.e., reference) other Flexforms. The section in the lower left is for defining mappings between the source (e.g., Java) constructs and various target (e.g., C) constructs. Where a mapping is one-to-one, the target constructs are determined automatically by mapping constucts in the source AST into the target tree.

Figure 9:
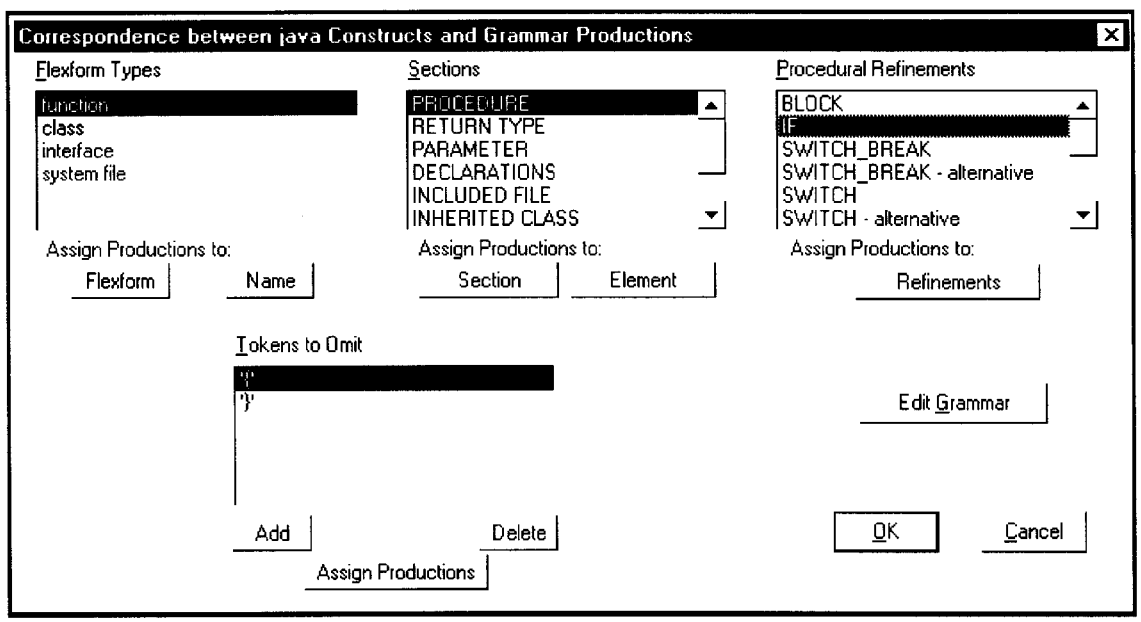

Next, productions in the associated grammars must be assigned to the previously specified constructs (see FIG. 8). Specific tokens in productions in the grammar must be assigned to the to-be-displayed language (i.e., Java) constructs. The dialog in FIG. 9 shows buttons indicating which tokens (in productions) are to be assigned to each Flexform type, which tokens are to be assigned to Sections and which tokens are to be assigned to procedural refinements. It also makes it possible to specify tokens (e.g., "{", ";") to be omitted from the display.

Figure 10:
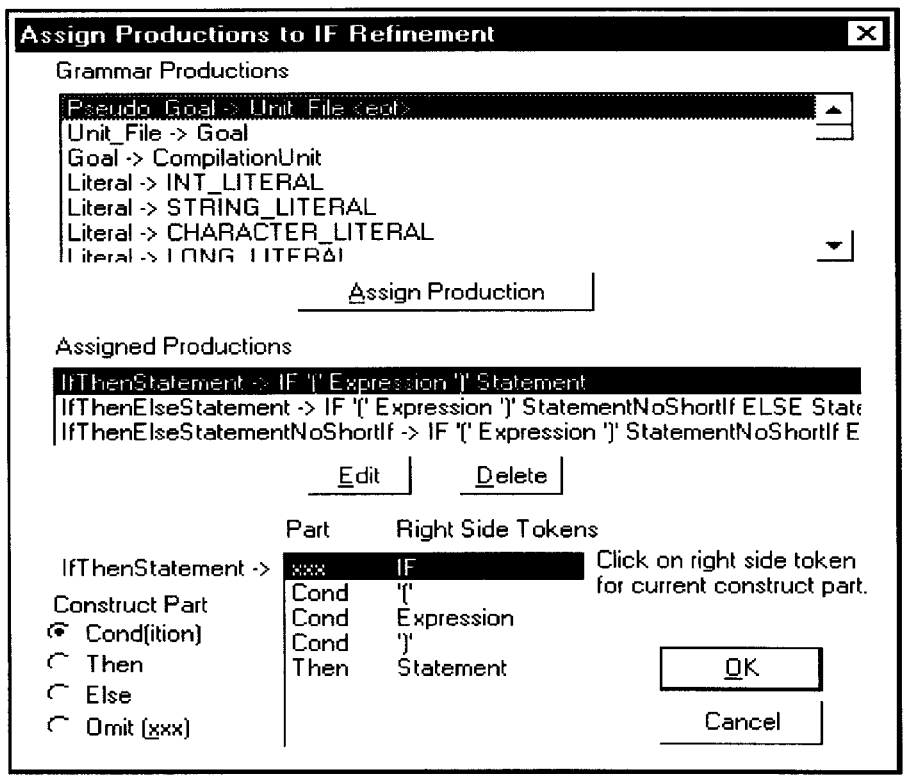

In FIG. 9, the user has chosen to assign productions to IF procedural refinements. FIG. 10 shows a sample interface used in the preferred Flexsys embodiment to assign tokens in individual productions to language constructs. In this case, the title bar indicates that we are to assign productions to IF refinements. As shown in the middle list, we have already assigned three productions to IF refinements. (If assign were pressed again, the highlighted production at the top would be added to the list.) The bottom list shows all parts (e.g., condition) of the IF construct. One or more right side tokens are usually selected for each part, although parts sometimes are not needed (e.g., the 'else' for a selection construct may be present in some productions but not others).

Once the above information has been provided, Flexsys has all of the information necessary to create an automated reverse engineer for Java as described in FIG. 1. Flexforms are used in the preferred embodiment but it is clear to anyone skilled in the art that any other representation also could be used. FIG. 2 details the process used in automating construction of the reverse engineering system associated with the given grammar. This reverse engineer takes Java programs as source (i.e., input) and generates a corresponding set of Flexforms (i.e., compressed ASTs).

Although all of the necessary code can be generated automatically, it is desirable in practice to test the reverse engineering machinery on actual source code. In Flexsys the Generate Language option in the Language Tools pulldown is used to generate the necessary runtime data. Generate Language will report grammar conflicts and/or lexical pattern errors. Once these basic, statically identified errors have been fixed, the machinery should be tested on sample files in the new language or dialect. The resulting diagrams (e.g., Flexforms) should contain the desired structure and contents (e.g., pseudocode) corresponding directly to the original source. Any necessary adjustments to the grammar, lexical patterns and assigned productions should be made before proceeding. As a last resort, SLANG commands and HLD mini-procedures may be customized to obtain the desired results. Placing a <ctrl B> at the beginning of a SLANG command or the root of an HLD mini-procedure is used to ensure that these commands are retained during any subsequent editing.

The information gathered also makes it possible to automatically construct the corresponding Java Flexform (fraud) grammar. Specifically, Flexform grammars may be, but do not have to be, derived from previously specified reverse-engineering (full) grammars, together with relationships between productions in that grammar and Flexform constructs (as in FIG. 9). Flexform grammars apply only to individual Flexform nodes. In the preferred embodiment, Flexform grammars are used for syntax-checking individual nodes, automatically declaring variables and detecting unused variables. No SLANG or HLD commands need be assigned to productions in syntax-checking grammars. Anyone skilled in the art can easily identify other applications for fraud grammars.

Figure 12:
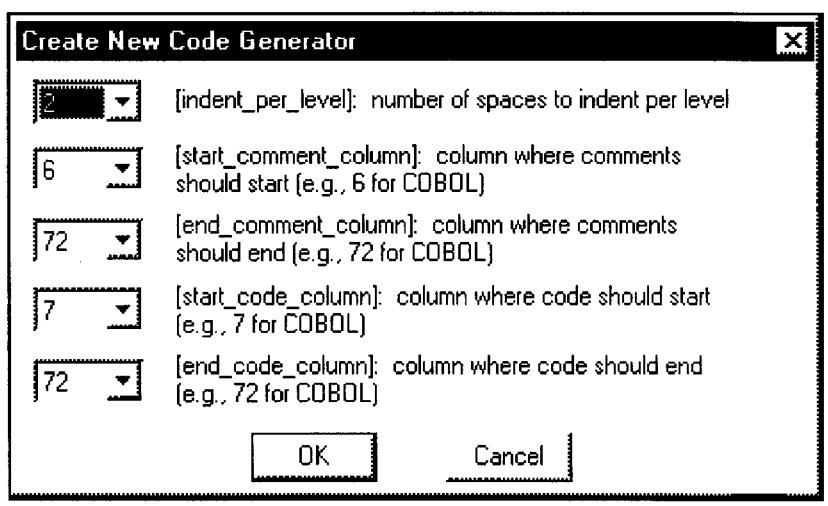

Part of the Java Flexform grammar constructed as above is shown in FIG. 11. This grammar can be used to parse (e.g., syntax check) the contents of individual nodes (elements) in Java Flexforms. FIG. 3 details the basic process. When information pertaining to Flexform constructs (i.e., information in FIG. 8 supplemented with to-be-omitted tokens in FIG. 9) is supplemented with formatting information, as illustrated in FIG. 12, a code generator for reconstructing original source code (from Flexforms) also can be generated automatically.

To test the new Flexform syntax grammar, the Generate Language option in Flexsys under the Language Tools pull down is used to generate the runtime data. Generate Language will report conflicts in your grammar and errors in your lexical patterns. (Lexical patterns will not normally have to be changed unless the grammar has been changed. If new terminal tokens are added to a Flexform grammar, lexical patterns must be updated accordingly. In the preferred embodiment, this can be accomplished by simply pressing the Update button in the dialog box of FIG. 7.) In general, conflicts should be fixed before proceeding further.

The syntax checking machinery can be tested on Flexforms obtained by reverse engineering. Frequently, the Flexform grammar will not require any changes. Nonetheless, it will sometimes be necessary to fix typos or other "human" errors, or to adjust the grammar, lexical patterns or assigned productions before proceeding. Conflicts may occur in automatically generated Flexform (i.e., fraud) grammars when multiple productions have been assigned to a single part of a Flexform construct (e.g., element in DECLARATION section). These should be eliminated before proceeding. You may wish to change the Flexform structure or reorganize the grammar so productions do not conflict.

Reverse engineered code can be modified and/or converted as desired by creating one or more conversion grammars (e.g., to solve Year 2000 problems, support a new database, move to client-server, etc.). A default conversion grammar is created automatically from the syntax grammar by adding default SLANG commands for each production. Default SLANG commands leave node contents unchanged. (NOTE: In rare cases, the user may want to create a conversion grammar which differs from the Flexform syntax checking grammar. This can be accomplished in the preferred embodiment by selecting or constructing the conversion grammar directly (e.g. from another grammar or the corresponding full grammar rather than the syntax grammar)).

FIG. 13 shows sample productions in the fraud Java grammar supplemented with default commands. Sample default commands are shown below the second set of (i.e., rectangle containing) productions. (Each box below the production grouping represents the output of the corresponding production.) These default commands are automatically derived and leave input Flexforms in their original form. Other SLANG commands may be attached to perform essentially any desired operation. Commands attached to productions in fraud grammars are used to convert text terminal nodes (e.g., statements, declarations) in compressed ASTs from one form to another. For example, the first command "1+2" in FIG. 13 applies to the first production "simple_statement_definition_>THROW Expression". It places the first right hand token "THROW" first and, "Expression" second. The command 2+1, of course, would do the reverse. More complex SLANG commands (see above) are used to construct or modify structures, save files, etc. SLANG commands apply in a context free manner to terminal nodes (elements) in Java Flexforms. Mini-procedures (e.g., constructed commands) in the HLD language operate in a context sensitive manner on data generated by previously executed commands. Mini-procedure commands are commonly used, for example, to construct and access symbol tables. In both cases, the commands introduced effectively define the target for individual productions in the fraud grammars.

As above, conversion machinery must be tested (e.g., on reverse engineered Flexforms). Again, the Generate Language option under the Language Tools pull down is used to generate runtime data. Generate Language will report grammar conflicts and errors in lexical patterns (normally the latter will not appear unless the grammar has been changed). These must be fixed before proceeding.

In addition to fixing typos or other "human" errors, some adjustments to the grammar or lexical patterns may be desirable in rare cases. Generally speaking, however, one need never deviate from the syntax grammar (i.e., conversion grammars should be identical). This can typically be assured at the expense of slightly more complex SLANG or mini-procedure commands. To obtain desired results, of course, SLANG and/or HLD commands must be added or constructed as appropriate. Typically, changing small numbers of default commands can have a major effect on results. Adjusting SLANG commands is sufficient in the majority of cases because desired results can often be obtained by adjusting individual nodes. HLD mini-procedures should be used where memory between productions is required. Special mini-procedures also may be introduced for pre- or post-processing of individual nodes, Flexform modules and/or the entire system. Placing a <ctrl B> at the beginning of a SLANG command or the root of an HLD mini-procedure will ensure that these comands are retained during any subsequent editing.

As mentioned in regard to FIG. 8, mappings between source compressed ASTs (e.g., Flexforms) and target ones may be generated automatically. More complex mappings are constructed manually using commands in Flexsys HLD language. The HLD language has been explicitly designed for manipulating ASTs represented as Flexforms. In principle, HLD commands may be inserted at any point before or after individual nodes are processed. In the preferred Flexform embodiment, however, HLD commands operate only before or after individual Flexform modules and/or entire systems are processed. This makes things much simpler and appears adequate for essentially any conversion involving a grammar-based language.

While the invention has been described in terms of a preferred embodiment using a specific methodology in a specific system environment, those skilled in the art recognize that the invention can be practiced, with modification, using other methodologies and in other and different hardware and software environments within the spirit and scope of the appended claims.

Having thus described our invention, what we claim as new, and desire to secure by letters patent is:

We claim:

1. A method for constructing language specific reverse engineering systems for automatically extracting compressed ASTs with attributes, called Flexforms in the preferred embodiment, from arbitrary source code in a plurality of structured languages;

wherein said method minimizes the need for human input and automates many difficult and key steps in the process, wherein each said language has a well defined grammar and lexical analyzer to which some general purpose parser generator can be applied to create a parser for source code written in said language;

wherein the terminal nodes in said compressed ASTs contain statements, declarations and/or expressions in said source code and wherein the non-terminal nodes in said compressed ASTs correspond to higher level constructs in said code, said method comprising the steps of:

a) receiving a grammar and lexical analyzer for said language and an associated language independent parser generator;

b) one of receiving and constructing a set of programming commands sufficient for constructing said compressed AST representations of said source code in said language of step a;

c) identifying constructs in said language of step a, including the allowable types of said compressed ASTs and the allowable sections and kinds of procedural refinements in each said type of compressed AST, that are to be represented as non-terminal nodes in said compressed AST;

d) for each said construct of step c, identifying those right hand side tokens in specific productions in said grammar of step b that collectively comprise one of said construct and the name of said node representing said construct;

e) for each said specific production in step d that corresponds to one said construct of step c, assigning commands from step b, which operate on nodes corresponding to said right side input tokens in said production and generate a node in said compressed AST that corresponds to that said construct;

f) for each said specific production in said grammar of step a that does not correspond to any said construct of step c, assigning a default command which automatically decides whether to concatenate the contents of given nodes or to construct a subtree containing said nodes; and g) applying said general-purpose parser generator to the results of said steps e and step f.

2. A method in accordance with claim 1 wherein step e of said assigning commands further comprises inserting a command for said construct, which operates on previously inserted said commands, said commands being successively embedded in the order that said corresponding productions are reduced during parsing, said embeddings being in the order of least to most encompassing said construct.

3. The method of claim 1; with a given a grammar for one of a plurality of languages and constructs in said language identified in accordance with step c of claim 1, a method for constructing a complementary fraud grammar from said grammar, wherein said fraud grammar is sufficient for parsing text in all said terminal textual elements in said compressed AST, said method comprising the steps of:

h) designating a top-level goal token for said fraud grammar;

i) for each construct identified in step c of claim 1, identifying a unique fraud token for each kind of said terminal textual element;

j) for each kind of said unique fraud token of step i, constructing a top level fraud production in said fraud grammar with said top-level goal token of step h on the left side, and the corresponding said unique fraud token of step i on the right side followed by right side tokens selected from said grammar, which represent constructs in said terminal textual elements;

k) for each right side token in each said fraud production of step j, which is not a said fraud token, include in said fraud grammar each production in said given grammar in which said right side token of said fraud grammar is on the left side of said added production; and l) repeating step k for each said right hand side token in productions in said fraud grammar, which are not said fraud productions, until there are no additional said right side tokens on the left side of a production in said given grammar.

4. The method of claim 1; with a given a compressed AST, wherein said terminal nodes of said compressed AST appear as human understandable text, and any one of a plurality of fraud grammars that is sufficient for parsing statements in terminal nodes of said compressed AST, a method for analyzing and converting at least one of said compressed AST and said text in terminal nodes of said compressed AST, wherein said text may be manipulated independently of said compressed AST, wherein said method makes it easier to construct code for said analysis and conversion than one of constructing code that operates directly on a corresponding uncompressed AST and attaching commands to productions in a corresponding full grammar, said method comprising the steps of:

m) when the user desires to modify the structure of said compressed AST, then constructing code, which applies directly to nodes and structures in said compressed AST;

n) when the user desires to modify said text in terminal nodes of said compressed AST, one of;
  (i) constructing a statement level AST for each terminal node in said compressed AST using said fraud grammar constructed in accordance with claim 3 and constructing code which operates on said statement level AST and
  (ii) not creating said statement level AST and attaching commands to productions in said fraud grammar.

5. A method in accordance with claim 1, wherein said compressed AST is a Flexform.

6. A method in accordance with claim 1, wherein said commands in step b are sufficient for constructing said compressed AST, wherein said compressed AST is one of a Flexform and another specified kind of compressed AST.

7. A method in accordance with claim 1, whereby said compressed AST is partitioned into separately linked ASTs, wherein said separately linked ASTs include ASTs that represent modules in said source code of claim 1, ASTs that one of lists and represent relationships between one of modules, text files and compilation units in said source code, said method resulting in linked ASTs, which can be processed individually thereby ensuring that traversal and hence processing times increase more slowly with size of corresponding source code than uncompressed ASTs which are not so partitioned, wherein step e of assigning commands to said specific productions further comprises:

o) splitting said compressed AST into said module ASTs and said ASTs that one of lists modules and represents relationships between modules or lists modules and represents relationships between modules.

8. A method in accordance with claim 1, wherein said given grammar is a fraud grammar and wherein said method of claim 1 creates a reverse engineer for converting text in each terminal node of a compressed AST into a Flexform or statement-level AST.

9. A method in accordance with claim 1 wherein the default command of said step f of claim 1, which automatically decides whether to concatenate the contents of given nodes or to construct a subtree containing said nodes based on whether nodes are complete, in which case the node represents a token in said grammar of claim 1 corresponding to a construct of step c of claim 1, or not complete, in which case the node does not represent a said token corresponding to said construct, further comprises:

p) when said given nodes are complete, then the default command returns a parent node with said complete nodes as children;

q) when one said given node is complete and one said node is the root of a subtree, then the default command returns the subtree with the complete node as a child;

r) when one said given node is complete and one said node is not complete, then the default command returns said complete node to which the contents of the incomplete node have been appended; and s) when neither said given node is complete, then the default command returns a node containing a concatenation of the contents of the nodes.

10. A method in accordance with claim 1, wherein said arbitrary source code may be structured text having any one of a plurality of well-defined grammars and lexical patterns from which parsers and lexical analyzers may be generated using a general purpose parser generator.

* * * * *